United States Patent
Gulotty, Jr. et al.

(10) Patent No.: US 9,233,367 B2
(45) Date of Patent: Jan. 12, 2016

(54) PROCESS FOR SYNTHESIS OF MOLYBDENUM SULFIDE-BASED CATALYSTS

(75) Inventors: Robert J. Gulotty, Jr., Glendale, AZ (US); Dean M. Millar, Midland, MI (US); Albert E. Schweizer, Jr., Port St. Lucie, FL (US); Raymond M. Collins, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 120 days.

(21) Appl. No.: 14/008,774

(22) PCT Filed: Apr. 1, 2011

(86) PCT No.: PCT/US2011/030884
§ 371 (c)(1),
(2), (4) Date: Sep. 30, 2013

(87) PCT Pub. No.: WO2012/134490
PCT Pub. Date: Oct. 4, 2012

(65) Prior Publication Data
US 2015/0139890 A1    May 21, 2015

(51) Int. Cl.
*B01J 37/20* (2006.01)
*B01J 23/88* (2006.01)
*B01J 23/882* (2006.01)
*B01J 27/051* (2006.01)
*B01J 35/02* (2006.01)
*B01J 37/00* (2006.01)
*B01J 37/02* (2006.01)
*B01J 37/03* (2006.01)
*B01J 37/08* (2006.01)
*B01J 37/16* (2006.01)
*C01G 51/00* (2006.01)

(52) U.S. Cl.
CPC *B01J 37/20* (2013.01); *B01J 23/88* (2013.01); *B01J 23/882* (2013.01); *B01J 27/051* (2013.01); *B01J 27/0515* (2013.01); *B01J 35/023* (2013.01); *B01J 37/0045* (2013.01); *B01J 37/0236* (2013.01); *B01J 37/033* (2013.01); *B01J 37/08* (2013.01); *B01J 37/16* (2013.01); *C01G 51/30* (2013.01)

(58) Field of Classification Search
CPC .......... B01J 27/00; B01J 27/051; B01J 37/00; B01J 37/08; B01J 37/16
USPC ................................................. 502/216, 220
IPC .................... B01J 27/00, 27/051, 37/00, 37/08, B01J 37/16
See application file for complete search history.

(56) References Cited

U.S. PATENT DOCUMENTS

| | | | |
|---|---|---|---|
| 4,491,639 A * | 1/1985 | Happel et al. ................. | 502/219 |
| 4,752,623 A | 6/1988 | Stevens et al. | |
| 4,825,013 A | 4/1989 | Quarderer et al. | |
| 2010/0279856 A1 | 11/2010 | Dykstra et al. | |
| 2010/0280287 A1 | 11/2010 | Kharas et al. | |

FOREIGN PATENT DOCUMENTS

| | | |
|---|---|---|
| CN | 101185895 A | 5/2008 |
| EP | 0216472 | 4/1987 |
| WO | 2008045551 A2 | 4/2008 |

OTHER PUBLICATIONS

PCT/US2011/030884, International Search Report and Written Opinion Mailed Dec. 23, 2011.
PCT/US2011/030884, Response to Written Opinion, Dated Jan. 29, 2013.
PCT/US2011/030884, 2nd Written Opinion, mailed Mar. 26, 2013.
PCT/US2011/030884, Response to 2nd Written Opinion Dated May 22, 2013.
PCT/US2011/030884, International Preliminary Report on Patentability, Mailed Jul. 4, 2013.

* cited by examiner

*Primary Examiner* — Patricia L Hailey

(57) ABSTRACT

A process for preparing a molybdenum sulfide-based catalyst comprises drying a precipitated molybdenum sulfide-based catalyst precursor, for example, a wet filter cake, such that a particulate catalyst precursor, containing from 12 to 15 percent by weight water, is formed. The particulate catalyst precursor is desirably in the form of free-flowing particles. The particulate catalyst precursor is then auto-reduced. A rotary furnace that subjects the catalyst precursor to at least two zones having distinct temperatures may be conveniently used for drying, auto-reduction, or both. The staged drying and auto-reduction steps reduce the tendency of the precursor to self-heat, which is undesirable because it reduces both the activity and selectivity of the final catalyst.

9 Claims, No Drawings

PROCESS FOR SYNTHESIS OF MOLYBDENUM SULFIDE-BASED CATALYSTS

This application is a national stage entry of International Application PCT/US2011/030884, filed on Jan. 4, 2011.

BACKGROUND OF THE INVENTION

1. Field of the Invention

This invention relates to preparation of catalysts such as those that are frequently employed to convert synthesis gas to an alcohol. More particularly, this invention relates to an improved process to dry the precipitated catalyst precursor attained during production of such catalysts to form a free-flowing particulate catalyst precursor having a reduced propensity for oxidation and self-heating on exposure to air, which would lead to decreased catalyst activity and selectivity to desired alcohols.

2. Background of the Art

Catalysts including molybdenum, sulfur and, optionally, cobalt have been found to be useful to convert synthesis gas to an alcohol. Synthesis gas is a mixture of carbon monoxide and hydrogen and is one of the most readily available starting materials for production of alcohols. These alcohols may include, in non-limiting example, ethanol and propanol. The molybdenum sulfide-based catalysts have been found to be very important in increasing both the alcohol production rate and yield, but processes to produce the catalysts themselves at large scale (metric tons and above) have often faced problems. These problems include, in many cases, a wet filter cake that is difficult to handle and/or dried catalyst precursor that may undergo oxidation and self-heating which leads to a decline in activity.

Thus, those skilled in the art have sought an effective method to convert a wet filter cake to a useful final catalyst that has performance at commercial scale that is comparable to that attained at laboratory scale. For example, United States Patents U.S. Pat. No. 4,752,623 to Stevens et al. and U.S. Pat. No. 4,825,013 to Quarderer et al. both describe processes for drying various catalyst preparations that include cobalt and molybdenum that include heating at 500° C. in an inert atmosphere such as nitrogen.

Unfortunately, when used to produce large volumes of catalyst for pilot scale or commercial scale production (0.1-100 metric tons (mT)), these methods may still result in catalyst precursors that suffer thermal run-away by oxidation. This oxidation may lead to creation of oxy-sulfide and oxide phases, which in turn reduce the catalyst's selectivity toward alcohols. These phases are not easily sulfided back to the active catalyst phase, even with a separate additional sulfiding procedure. Furthermore, at various points in these processes the catalyst precursors may be either too wet, such that the particles stick together and do not flow, or they are dried to a point of extremely low moisture content (for example, less than 1 weight percent), which makes them more easily auto-oxidized and more likely to suffer thermal run-away. Thus, there continues to be a need in the art for processes to prepare these catalysts that avoid the problems cited hereinabove.

SUMMARY OF THE INVENTION

In one embodiment the invention provides a process for preparing a molybdenum sulfide-based catalyst comprising drying a precipitated molybdenum sulfide-based catalyst precursor under conditions such that a particulate catalyst precursor containing from 12 to 15 percent by weight water is formed and then thermally auto-reducing the particulate catalyst precursor at a temperature ranging from 350° C. to 550° C. to form a catalyst.

In another embodiment, the invention provides a process for preparing a molybdenum sulfide-based catalyst comprising treating a precipitated molybdenum sulfide-based catalyst precursor in a rotary furnace fitted with a screw for moving the precipitated catalyst precursor into and through the furnace, under conditions such that the precipitated catalyst precursor is dried and thermally auto-reduced. In various embodiments, the rotary furnace may include one, two, three or more distinct temperature zones having specific temperatures to optimize drying.

DETAILED DESCRIPTION OF THE EMBODIMENTS

The invention provides a preparation process for a molybdenum sulfide-based catalyst specifying a moisture content and other conditions under which the catalyst's precipitated precursor may be transformed to particles and, in particularly preferred embodiments, to free-flowing particles. It also facilitates further processing to prepare the final catalyst that may be suitable for practice on a commercial scale. As used herein, the term "molybdenum sulfide-based" refers to catalyst(s) or catalyst precursor(s) containing at least molybdenum and sulfur, but which may also contain additional metals including, but not limited to, cobalt, nickel, iron, chromium, manganese, tungsten, vanadium and zirconium.

The precipitated catalyst precursor is the molybdenum sulfide-based reaction product which has been isolated from the reaction mixture, but not yet subjected to any further processing. This precipitated catalyst precursor may be prepared by a reaction of, for example, ammonium tetrathiomolybdate and cobalt acetate; ammonium heptamolybdate, ammonium hydrosulfide and cobalt acetate; or ammonium helptamolybdate and ammonium sulfide. Examples of suitable methodology to prepare the precipitated catalyst precursor are discussed in, for example, U.S. Pat. No. 4,825,013, which is incorporated herein by reference in its entirety.

Once the precipitated catalyst precursor has been prepared, it may be subjected to either a combination of vacuum drying and pressure filtration, using, for example, a diaphragm or membrane filter, which results in formation of a so-called "wet filter cake," or the precipitated catalyst precursor may be used to form a slurry suspension which is then spray-dried.

Where vacuum drying and pressure filtration are selected, the vacuum dryer temperature desirably ranges from 30 degrees Celsius (° C.) to 70° C., more desirably from 39° C. to 47° C., and dryer pressure ranges from 5 kilopascals (kPa) to 30 kPa, more desirably from 10 kPa to 15 kPa. Filtration pressures may range from 207 kPa to 620 kPa, desirably from 379 kPa to 517 kPa. Drying time may range from 30 minutes to 24 hours, desirably from 30 to 120 minutes. Drying in the vacuum dryer may be carried out under an inert atmosphere, for example, nitrogen, or alternatively employing an air feed. Where air is employed, the air feed rate desirably ranges from 1 to 10 standard cubic feet per minute (scfm) (28.37 liters per minute (L/min) to 283.17 L/min) for a 100 liter (L) vacuum drier. An air feed rate in this range may accomplish passivation of the precipitated catalyst precursor. This passivation will help to reduce any potential self-heating that the precursor may subsequently experience prior to auto-reduction, which will, in turn, help to preserve future catalyst activity and selectivity.

Where spray-drying is selected, the initial concentration of the precipitated catalyst precursor (the dispersed phase) may range from 10 percent by weight (wt %) to 40 wt % solids, but is desirably from 20 wt % to 35 wt % solids.

Regardless of which method is selected, it is desirable that the water content of the precipitated catalyst precursor be reduced to a level ranging from 12 wt % to 15 wt %, at which time it is desirably particulate and therefore referred to as the particulate catalyst precursor. At this point, and in preferred embodiments of the invention, the material is desirably in the form of free-flowing particles. For particles prepared from vacuum dried precipitate, the particles desirably exhibit an average size greater than (>) U.S. 40 mesh (0.400 millimeters (mm)), more desirably >U.S. 20 mesh (0.841 mm) and still more desirably >U.S. 10 mesh (2.00 mm) For spray-dried materials, U.S. 230-80 mesh particles (63 micrometer (μm)-177 um diameter particles) is typical.

Once the particulate catalyst precursor, having the defined water content, has been formed, it may be maintained in an inert atmosphere until subjected to thermal auto-reduction. Alternatively, the particulate catalyst precursor may be passivated in a separate step, assuming such was not carried out during the drying step as previously described, by means of exposure to dilute air (having a concentration of >0.1 percent by volume (vol %) and less than (<) 20 vol % oxygen), and subsequently auto-reduced. The auto-reduction may be carried out by heating at a temperature ranging from 350° C. to 550° C., more desirably from 450° C. to 550° C., using any means known to those skilled in the art to be useful for this level of heating. Such may include, but is not limited to, a rotary furnace wherein an inert atmosphere can be established and maintained. The auto-reduction step results in removal of remaining water as well as production of a product having a reduced tendency, in comparison with the product of some other methods, to self-heat, which helps to preserve final catalytic activity.

In one particular embodiment of the invention, initial drying of the precipitated catalyst precursor to form the particulate catalyst precursor, with or without passivation, and including auto-reduction, may be effectively and conveniently carried out in a rotary furnace. Where such means is selected it is useful to include more than one temperature zone within the rotary furnace and, also optionally, a means such as a screw to move the precipitated catalyst precursor into and through the furnace, so that it undergoes drying and auto-reduction to form a catalyst product. Such distinct temperature zones may include, in certain embodiments, a first temperature zone ranging from 150° C. to 400° C. and a second temperature zone ranging from 450° C. to 550° C. In other embodiments three distinct zones may be employed, including, for example, a first temperature zone ranging from 150° C. to 250° C., a second temperature zone ranging from 300° C. to 400° C., and a third temperature zone ranging from 450° C. to 550° C. In many embodiments that employ this protocol, drying and auto-reduction may be accomplished sequentially in less than 2 hours.

Following completion of the drying and auto-reduction steps described hereinabove, the catalyst may then be mixed with an alkali metal promoter, a lubricant, and an optional clay binder material, in order to make formed catalyst bodies such as pellets or extrudates. The alkali metal promoter may be any alkali metal in free or combined form. In one non-limiting embodiment, the alkali metal promoter is potassium carbonate. Desirably the alkali metal promoter ranges in amount from 1 wt % to 20 wt %, based upon the combined weight of the three components and, if present, the optional clay binder material. Preferably the alkali metal promoter is from 5 wt % to 15 wt %, on the same basis. The alkali metal promoter may be simply dry-blended with the molybdenum sulfide-based catalyst particles or the particles may be impregnated with the promoter from an aqueous or non-aqueous promoter solution. A lubricant, such as a stearate, is desirably added at from 2 wt % to 6 wt %, frequently 4 wt %, based upon the combined weight of the three components and the clay binder material, to aid in pellet formation. The optional clay material is desirably in an amount ranging from 5 wt % to 30 wt %, on the same basis. In particular embodiments, the amount of clay binder material is from 15 wt % to 25 wt %, on the same basis. Those skilled in the art will be readily able to determine appropriate methods and materials to use for pelletization or extrusion, if desired, of the catalyst without further direction herein.

The following examples and comparative examples are intended to illustrate the invention and are not intended to be, nor should they be construed as being, limitative of the invention in any way.

EXAMPLES

Comparative Example A

Prepare a reaction mixture by combining 467 pounds (lb) (211.8 kilograms (kg)) of cobalt acetate, 662 lb (300.3 kg) of ammonium heptamolybdate, 2311 lb (1048.2 kg) of ammonium sulfide (aqueous (aq.)) (44.2 wt %), 2666 lb (1209.3 kg) of glacial acetic acid and 10664 lb (4837.1 kg) of distilled water in a 4000 gallon (15.1 cubic meter ($m^3$)) reactor. Allow the reaction mixture components to react at a temperature of 50.6° C. to 64.4° C. for a period of 1 hour (hr) and then hold at 60° C. for 1 hr to yield a product solution. Pump the product solution to a membrane filter press that contains 10 plates and convert the product solution into filter cakes that have a thickness of 17 millimeters (mm) and a moisture content of 49.6 wt %, based upon filter cake weight.

Charge the wet filter cake or precipitated catalyst precursor, weighing 210.5 lb, (95.9 kg) to a 100 L conical agitated batch vacuum dryer. Dry the material with 77° C. oil on the jacket, an absolute pressure of 100 millimeters mercury (0° C.) (mm Hg) (13.3322 kPa), and a purge of 1.5 scfm (42.48 L/min) air through the partially opened discharge valve. The internal temperature ranges from 39° C. to 47° C. Stop the dryer when 59 lb (26.8 kg) of water have been collected. When the dryer is discharged, collect in a pail 50.8 lb (23.0 kg) of tar-like material, which have been trapped in the discharge valve. Recover 79.2 lb (35.9 kg) of dry product.

Determine that the product is a viscous sludge which is too wet to easily transfer to or feed into a rotary furnace, and charge it back to the vacuum dryer along with the tar-like material from the valve, and another 308.8 lb (140.1 kg) of wet filter cake. For the first 2 hr, dry the material using the same conditions as described hereinabove. At the 2 hr mark, increase the jacket temperature to 82° C. and discontinue the air purge. Keep the discharge valve closed during the remainder of the run. The internal temperature ranges from 43° C. to 51° C. Determine, by visual and manual inspection, that the batch is appropriately dry for transfer to or to feed into a rotary furnace, then passivate the material using a 3 scfm (84.95 L/min) air/9 scfm (254.85 L/min) nitrogen purge for 2 hr. Increase the internal temperature to 77° C. during the passivation. Purge the dryer with nitrogen during cooling. The product from this batch is a very dry, dusty powder, having less than 1 wt % moisture.

Comparative Example B

Repeat the preparation steps in Comparative Example A, except change the drying protocol. Operating conditions, however, are the same, including a temperature of 82° C. oil on the jacket and an absolute pressure of 100 mm Hg (0° C.) (13.3322 kPa). Do not use an air or nitrogen purge while drying. Initial charge is 238.7 lb of wet filter cake. Remove 90 lb of water from the wet filter cake, then charge an additional 134.1 lb of wet filter cake and continue the drying. The internal temperature ranges from 41° C. to 55° C. Determine, by visual and manual inspection, that the batch is dry, then shut down the vacuum pump and release the vacuum using nitrogen. Purge the dryer with 3 scfm (84.951 L/min) nitrogen and 1 scfm (28.317 L/min) air for 2 hr. The internal temperature is 40° C. during the passivation. After the 2 hr passivation, purge the dryer with 1 scfm (28.317 L/min) air for 30 minutes. The internal temperature decreases from 42° C. to 38° C. during the air purge. Package the dried product into a nitrogen purged bag in a fiber drum.

Observe during this run that, if the wet filter cake material is not allowed to completely dry, as in Comparative Example A, the dryer produces a bead or marble-like product. Realize that this product might be flowable, provided it is not wet enough to be "sticky" and does not comprise a significant dust component. The dried product of this batch is 18.1 wt % water. Observe that this product is sticky and therefore does not "flow." Establish a target of less than 15 wt % water for future batches.

Comparative Example C

The drying and passivation conditions are the same as in Comparative Example B. Notice that the discharge valve feels very hot. Purge the valve with nitrogen and allow the valve to cool before discharging. Determine that, when the material in the dryer goes through the "tar" stage, some of it flows through the partially opened discharge valve and collects on top of the sparge plate. The passivation air causes the material in the area between the valve and the plate to oxidize. Because there is no mixing or cooling, the valve becomes very hot at this location.

Resolve this problem by installing a thin 316 stainless steel gasket between the discharge valve and the dryer. Drill four holes horizontally in the gasket and weld ¼-inch (6.35 mm) tubing to each hole. Connect the air/nitrogen line to a manifold that ties into each hole. Thereafter purge the dryer without opening the dryer's bottom valve. Product produced in corrected dryer is expected to have a reduced oxidized content, and therefore have a relatively higher catalytic activity, than product produced in an uncorrected dryer.

Example 1

Based on issues encountered in Comparative Examples A-C, in particular the very dry (1 wt % moisture content) product powder of Comparative Example A and the sticky particles of Comparative Example B, establish an improved drying protocol including charging approximately 250 lb (113.4 kg) of wet filter cake to the agitated vacuum batch dryer. Using the moisture content measurements, determine the water content of the wet filter cake. Dry the wet filter cake under conditions including 82° C. jacket and 100 mm Hg (0° C.) (13.3322 kPa). Do not purge the dryer with air or nitrogen during the drying step. Depending upon the amount of water in the material charged, remove 50 lb (22.68 kg) to 60 lb (27.22 kg) of water, and then stop the dryer in order to charge an additional 150 lb (68.04 kg) of wet filter cake. When the amount of water collected translates to a water content of 15 wt % remaining in the product, sample the dryer product. If the sample appears wet (i.e., sticky, not free-flowing), restart the dryer and remove an additional 10 lb (4.54 kg) of water. This is repeated until the dried product is free flowing beads with a water content of less than 15 wt %. When the batch is dry to this point, break the vacuum with nitrogen, and establish a 6 scfm (169.9 L/min) nitrogen purge to cool the batch. When the jacket temperature reaches 47° C., stabilize the product using a 3 scfm (84.95 L/min) nitrogen/1 scfm (28.32 L/min) air purge for 2 hr. Purge the dryer with 1 scfm (28.32 L/min) air for 30 minutes. Repeat this passivation procedure if the temperature rises above 50° C.

Example 2

This procedure produces a desirably aggregated, non-sticky, flowable particulate catalyst precursor. The jacket oil temperature is set at 95° C., which results in an actual jacket temperature, due to heat loss in the transfer lines, of 82° C. Establish a 2 scfm (56.63 L/min) air purge to the bottom of the dryer. Leave the purge on during the entire drying cycle. Initially charge to the agitated batch dryer approximately 250 lb (113.4 kg) of wet filter cake. Use the laboratory results from each filter drop to determine the water content of the wet filter cake.

Begin drying at 82° C. and 100 mm Hg (0° C.) (13.3322 kPa) vacuum. After 50 lb (22.68 kg) to 60 lb (27.22 kg) of water have been removed, stop the dryer and charge it with an additional 150 lb (68.04 kg) of wet filter cake. When the amount of water collected translates to a water content of 15 wt % remaining in the product, sample the dryer product. If the sample appears wet (i.e., sticky and/or not free-flowing), restart the dryer. If the laboratory result of the sample is more than 20 wt % water, remove an additional 15 lb (6.80 kg) of water and resample the product. If the laboratory result is from 15 wt % to 20 wt % water, remove an additional 8 lb (3.63 kg) of water and, again, resample. Repeat this until the dried product is free flowing particles with a water content of less than 15 wt %.

During drying, if the internal temperature rises to 65° C. or higher, turn off the air purge, establish a 2 scfm (56.63 L/min) nitrogen purge, and then halt further action until the temperature drops below 65° C.

When the batch reaches a water content of less than 15 wt %, break the vacuum with nitrogen and establish a 6 scfm (169.9 L/min) nitrogen purge to cool the batch. When the product temperature reaches 40° C., remove the product from the dryer to the nitrogen-purged plastic bag in a 55-gallon (208.14 L) plastic drum. The final product does not self-heat to a temperature above 100° C. and is in the form of free-flowing particles having a moisture content of from 12 wt % to 15 wt %.

Example 3

Modify a 6-inch rotary furnace to include three temperature zones. Add a screw to the front of the furnace to push the wet filter cake into the rotary furnace and prevent clogging of the furnace. Set the first temperature zone at 200° C.; the second zone at 350° C.; and the third zone at 500° C. Feed the material, which is the same as that of the previous Example 2 and Comparative Examples A-C, into the furnace at a rate of 1 kilogram per hour (kg/hr). The total residence time in the furnace is 1 hr, with the material spending 20 minutes in each temperature zone. Maintain an inert atmosphere in the rotary furnace throughout the residence time. The final product does not self-heat to a temperature above 50° C. and is in the form of free-flowing particles having a moisture content of from 12 wt % to 15 wt %. Continue to handle the solid under an inert atmosphere to the extent practical to complete both the compounding process (addition of clay, lubricant, and alkali metal promoter, for example, potassium carbonate) and subsequent pelletization.

What is claimed is:

1. A process for preparing a catalyst, comprising drying a precipitated catalyst precursor containing at least molybdenum and sulfur such that it contains from 12 to 15 weight percent water;

simultaneously with or subsequently to drying, accomplishing passivation of the precipitated catalyst precursor by exposing it to air, an inert atmosphere, or a combination thereof under conditions suitable to form a passivated particulate catalyst precursor, passivation being defined to mean that the particulate catalyst precursor does not self-heat to more than 100° C. if exposed to air; and then thermally auto-reducing the passivated particulate catalyst precursor at a temperature ranging from 350° C. to 550° C. to form a catalyst.

2. The process of claim 1 wherein the precipitated catalyst precursor is prepared from a reaction product of cobalt acetate, ammonium heptamolybdate and ammonium sulfide; or of ammonium tetrathiomolybdate and cobalt acetate; or of ammonium heptamolybdate and ammonium sulfide.

3. The process of claim 1 wherein the drying is carried out by either pressure filtration followed by vacuum drying, or by preparing a suspension of the precipitated catalyst precursor and then spray-drying the suspension.

4. The process of claim 1 wherein the drying is accomplished under vacuum and includes exposing the precipitated catalyst precursor to air, with or without added nitrogen, such that the precipitated catalyst precursor is simultaneously passivated.

5. The process of claim 1 wherein the passivated particulate catalyst precursor is vacuum dried and in the form of free-flowing particles having an average size greater than U.S 40 mesh (0.400 mm).

6. The process of claim 1 wherein the drying, passivation and auto-reduction are carried out in a rotary furnace.

7. The process of claim 6 wherein the rotary furnace is fitted with a screw for moving the precipitated catalyst precursor into and through the furnace.

8. The process of claim 7 wherein the rotary furnace has at least two distinct temperature zones, including a first temperature zone from 150° C. to 400° C.; and a second temperature zone from 450° C. to 550° C.

9. The process of claim 7 wherein the rotary furnace has at least three distinct temperature zones, including a first temperature zone from 150° C. to 250° C., a second temperature zone from 300° C. to 400° C., and a third temperature zone from 450° C. to 550° C.

* * * * *